Oct. 30, 1962   I. I. BOSWELL ET AL   3,061,779
ELECTRICAL MEASURING INSTRUMENT
Filed Feb. 13, 1959   2 Sheets-Sheet 1

INVENTORS
IAN IRVINE BOSWELL
MICHAEL NORTON
GRENIER GOLDSMITH
BY
Irwin E. Thompson
ATTORNEY

United States Patent Office 3,061,779
Patented Oct. 30, 1962

3,061,779
ELECTRICAL MEASURING INSTRUMENT
Ian Irvine Boswell and Michael Norton Grenier Goldsmith, Newport Pagnell, England; said Boswell assignor to Newport Instruments (Scientific and Mobile) Limited, Newport Pagnell, England, a British company
Filed Feb. 13, 1959, Ser. No. 793,122
Claims priority, application Great Britain Feb. 17, 1958
10 Claims. (Cl. 324—62)

This invention relates to electrical measuring instruments and is more particularly concerned with a device for measuring both very high resistance values, such as insulation resistances, and very low resistance values, such as those of continuity, earth bonding and the like.

In accordance with one feature of the invention, the measuring instrument comprises a transistor oscillator for providing a high voltage alternating current from a low voltage D.C. primary source, conveniently in the form of a dry battery, such high voltage alternating current output of the transistor oscillator being rectified for use as the test potential in the very high resistance or insulation range of the meter and said low voltage D.C. primary source being also arranged for use as the test potential source for one or more resistance measurement ranges of lesser value and for the very low resistance or continuity testing range.

In accordance with another feature of the invention, the measuring instrument is constructed with a multicompartment casing which may be of die-cast metal or moulded plastic material and in one compartment of which is assembled the majority of the more durable circuit components, such circuit components being potted or embedded in a body of suitable solid insulating material, such as a casting resin, within which body is also moulded a recess for accommodating the indicating meter of the instrument. In a preferred form of the device the open side of such casing is then closed by one or more suitable removable panels, that panel which covers the indicating meter being preferably formed of transparent plastic material which is suitably obscured except for a region thereof positioned to permit viewing of the meter pointer and scale.

In order that the above and other features of the invention may be more readily understood one particular constructional embodiment will now be described by way of illustrative example only and with reference to the accompanying drawings, in which.

Figure 1:
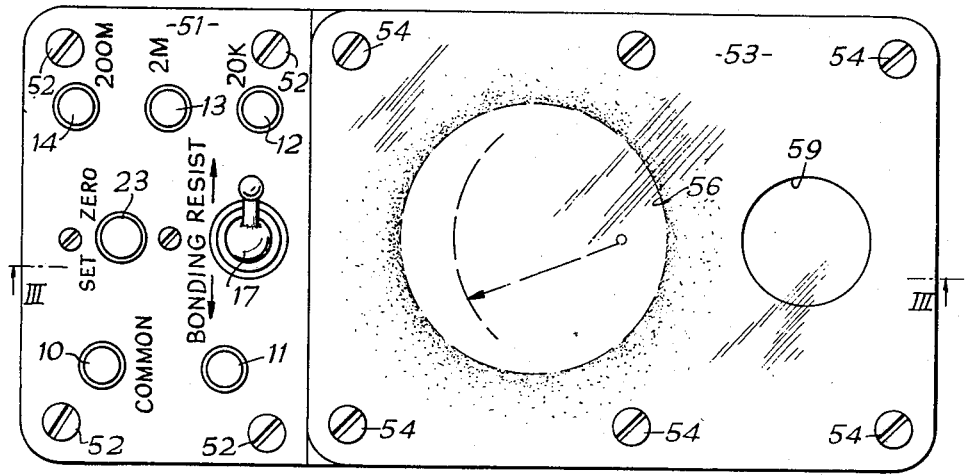
FIGURE 1 is a plan view of the assembled instrument.
Figure 2:
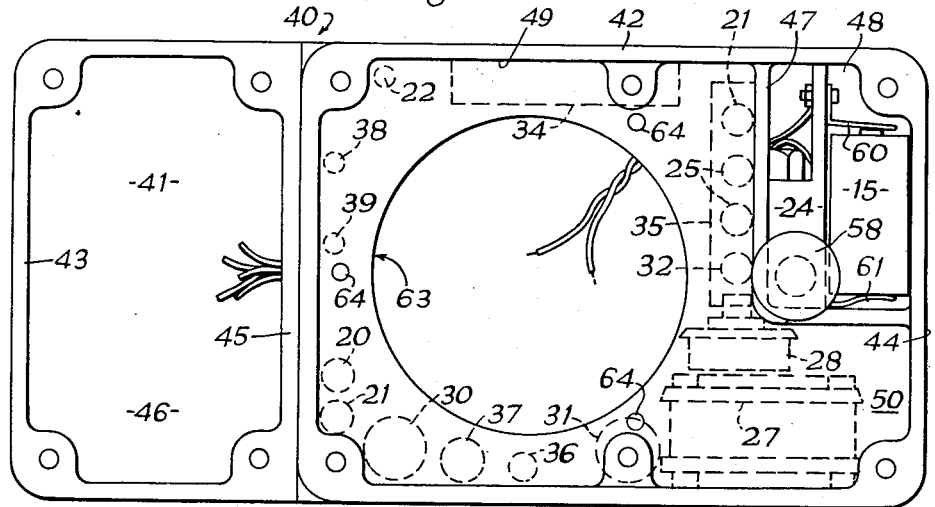
FIGURE 2 is a plan view of the instrument casing with its top closure panels removed and showing some of the various components which are embedded in plastic material.
Figure 3:
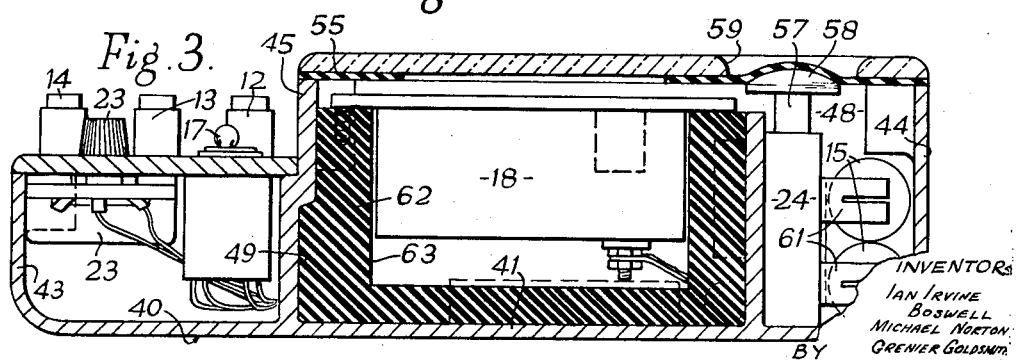
FIGURE 3 is a longitudinal sectional view taken on the line III—III of FIGURE 1.
Figure 4:
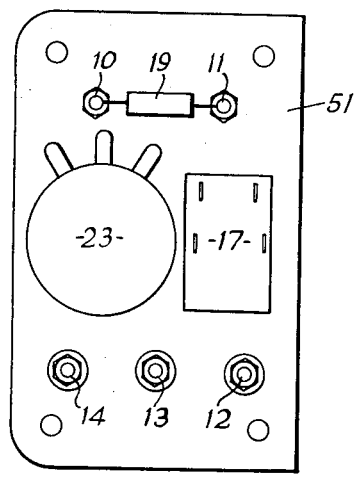
FIGURE 4 is an underside view of a sub-panel which is applied to close one of the non-potted compartments of the casing.
Figure 5:
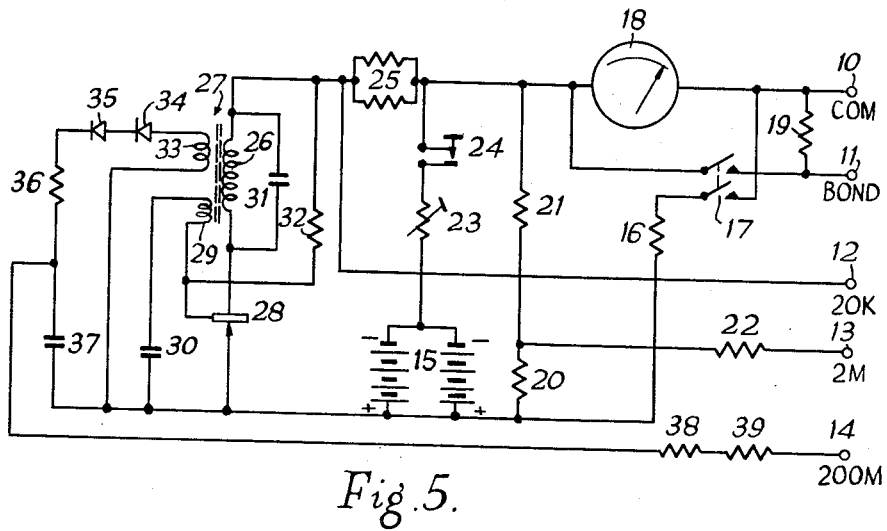
FIGURE 5 is a circuit diagram of the instrument.

The circuit employed will first be described with reference to FIGURE 5. The instrument is provided with five test terminals 10, 11, 12, 13 and 14, terminal 10 being a common terminal and the remaining four terminals for selective use according to the resistance measurement range required. It will be understood that the usual pair of flexible test leads will be joined one to terminal 10 and the other to the appropriate one of terminals 11–14 in the usual way. A pair of parallel-connected low-voltage dry batteries 15 (6 v.) constitute the primary D.C. power source and the positive terminal of this battery group is connected by way of a resistor 16 (56 ohms) to one terminal of a double-pole single-throw switch 17, the opposite terminal of the same switch pole being connected to the "common" terminal 10 and to the positive terminal of the indicating meter 18 (50 micro-amperes full scale deflection).

The opposite terminal of such meter 18 is connected through the other pole of the switch 17 to the terminal 11. This terminal is the "bond" terminal used for very low resistance measurements in conjunction with terminal 10. A resistor 19 (1 ohm) is connected directly between the terminals 10 and 11. The same positive pole of battery 15 is also connected through two series resistors 20 (2.2 kilo-ohms) and 21 (12 kilo-ohms) to the negative terminal of the meter 18 while the junction point between these resistors is connected through a further resistor 22 (100 kilo-ohms) to the terminal 13 which is used in conjunction with terminal 10 for resistance measurement in the range of 0–2 megohms.

The negative terminal of the battery 15 is connected through a pre-set variable resistance 23 (250 ohms) to one terminal of a press button type switch 24, the opposite terminal of which switch is also connected to said negative terminal of the meter 18 and by way of parallel-connected resistors 25 (each 12 ohms) to a first end terminal of the primary winding 26 of a step-up transformer 27. The opposite or second terminal of this primary winding 26 is connected to the collector electrode of a transistor 28 (type V15/10P). The emitter electrode of this transistor is connected to the positive terminal of the battery 15 while the base electrode is connected to one end of a first secondary winding 29 of the transformer 27, the opposite end of such winding 29 being connected through a series capacitor 30 (0.25 microfarad) to the emitter electrode and interconnected positive terminal of the battery 15.

Shunted across the primary winding 26 of the transformer 27 is a fixed capacitor 31 (0.25 microfarad) while connected between the base electrode of the transistor and said first end terminal of the primary winding 26 is a series resistor 32 (5.6 kilo-ohms). This same first end terminal is also directly connected to the test terminal 12 which is that used in conjunction with the "common" terminal 10 for resistance measurements in the range 0–20 kilo-ohms. The further secondary winding 33 of the transformer 27 has one end directly connected to the positive terminal of the battery 15 and its other end connected through serially disposed rectifier diodes 34, 35, resistor 36 (33 kilo-ohms), and fixed capacitor 37 (0.01 microfarad) to the same positive terminal of the battery 15. The junction between resistor 36 and capacitor 37 is connected by way of fixed resistors 38 and 39 (each 5 megohms) to the test terminal 14 which is that used in conjunction with the "common" terminal 10 for very high or insulation resistance measurements in the range of 0–200 megohms.

In the operation of the circuit arrangement as described closure of the press button switch 24 is necessary before any measurement can be made. When this switch is closed, battery current is applied to the transistor oscillator circuit of transistor 28, transformer 27 and the associated components to cause generation of a high voltage alternating current which is then rectified by the diode rectifiers 34, 35 to establish a high voltage D.C. test potential across the capacitor 37. This high voltage test potential is used when the high value or insulation resistance range is employed, the test circuit being completed from terminal 14 through the external test resistance and thence by way of terminal 10 and the meter 18 and thence through switch 24, zero adjust resistor 23, and battery 15 to the lower terminal of capacitor 37.

When the test terminal 13 is in use of high resistance measurements up to 2 megohms value, the aforesaid rectified high voltage output of the transistor circuit is not employed, the operating source being now constituted by the voltage dropped across resistor 21 due to the battery 15. Current flow is from the tap point between resistors 20 and 21, through resistor 22, the external test resistance circuit back to the "common" terminal 10 and so through the meter 18.

When the test terminal 12 is in use for measurements within the resistance range of 0–20 kilo-ohms, the test potential employed is the voltage dropped across resistors 25 by virtue of the flow of the transistor oscillator current therethrough. The measuring circuit is completed from terminal 12 through the external resistance to the "common" terminal 10 and thence through the meter 18 to the opposite side of the resistors 25.

In all of the above resistance tests the switch 17 is open as shown but in the final very low resistance or bonding measurement range, this switch is closed whereby, when the press button switch 24 is also closed, a current flow circuit is established through the meter 18 from the positive terminal of the battery 15 by way of resistor 16, meter 18, switch 24 and the zero adjust resistor 23 to the negative terminal of the battery 15.

The pre-set variable resistor 23 is adjusted in the usual way to obtain full scale deflection with the external test resistance leads are open circuited so that, upon connection of such test leads to the very low resistance which is to be measured, the resultant shunting effect thereof reduces the current flow through the meter to give the required indication. The variable resistance 23 is operative on all other ranges also as a zero adjuster by the usual method of adjusting to obtain full scale deflection of the meter 18 with the external test leads short-circuited.

Referring now to FIGURES 1 to 4, the meter construction shown comprises a multi-compartment casing 40 of rectangular form and including a bottom wall 41, side walls 42 and end walls 43 and 44, the end wall 43 being of lesser height than the opposite end wall 44. A transverse division wall 45 defines an end compartment 46 the upper surface level of which is at a lesser height than that of the remainder of the casing. A further partition wall 47 of angular shape separates a second end compartment 48 from the remaining middle compartment 49 and its annexe 50. The casing is preferably of one-piece construction and may be either of die-cast metal or of moulded plastic material.

The lesser height end compartment 46 is closed by a removable cover plate 51 secured by screws 52 entering lugs on, preferably formed integrally with, the casing body. On this cover plate 51 is mounted the five test terminals 10, 11, 12, 13 and 14 together with the double-pole single-throw switch 17 and the zero-adjust resistance 23.

The compartments 48, 49 and 50 are likewise closed by a removable cover plate 53 secured by screws 54 entering appropriate lugs on, preferably formed integrally with, the casing 40. This cover plate 53 is hermetically sealed to the top of the casing by means of an interposed gasket 55, e.g. a sheet of resilient material such as rubber. As will be explained later the central compartment contains the indicating meter 18 and to permit viewing of this in a manner which preserves the hermetic sealing, the cover plate 53 is made of transparent material, e.g. a transparent plastic material, and an aperture is provided in the interposed gasket. For sake of appearance the underside of the transparent cover plate is preferably obscured as by a layer of paint or the like except for a circular viewing orifice 56 coincident with the meter scale and pointer.

Within the small end compartment 48 is located the push-button switch 24 formed with an upstanding operating plunger 57 having an enlarged head 58. This head is located to lie in alignment with a circular opening 59 formed in the cover plate 53 with the head disposed underneath the interposed gasket layer 55 whereby manual operation of the press button switch is possible while preserving the hermetic sealing of the cover plate to the casing. The small end compartment 48 also houses the two dry battery units which constitute the battery 15, the connection to these being effected by suitable spring contact blades 60 and 61.

Within the remaining middle compartment 49 and its annexe 50 are collected all of the remaining components of the circuit including the transformer 27 and the transistor 28. After assembly and interconnection of these various circuit components in the required manner all except the indicating meter 18 are embedded or potted within a body of suitable solid insulating material 62, such as a casting resin, whereby the whole of the compartment and its annex is filled to the level of the partition wall 47. In this way the casing itself is effectively strengthened as well as the provision the usual advantages of protection against moisture and the like. It will be understood that the potted or embedded components are those of which are of more durable and stable character, that is to say, components which are unlikely to need attention or replacement during the normal working life of the instrument. Those components, such as variable resistances, switches and the indicating meter which are more likely to need attention as well as the expendible elements constituted by the dry cell batteries, are all located in positions which permit ready access thereto.

For the purpose of housing the indicating meter 18 a separate recess 63 is moulded into the body 62 of embedding or potting material during the casting of the latter by the use of an appropriate mould insert. During this process appropriate tapped sockets 64 may be embedded within the body of material to receive the usual retaining screws passing through the flange of the indicating meter 18.

In a particular method of assembly a mould block of the appropriate size and shape to provide the appropriate recess for the meter 18 is secured upon a suitable body or plate and the remainder of the circuit components which are to be located in the mid compartment 49 and annexe 50, are assembled around it in conjunction with the necessary wiring interconnections. If necessary one or more jigs may be used to locate the components whilst the wiring is being effected. Use is also preferably made of sub-assemblies employing printed circuit elements. The casing 40 is then placed, in inverted position, upon the assembled component and the whole structure reversed to bring the mounting body or plate uppermost. The remaining space within the compartment 49 and annexe 50 is then filled with casting material through a suitable pouring aperture. When the casting material is set, the mounting plate and the meter mould block are removed and the meter 18 inserted into place within the recess provided after connection of its terminals to appropriate projecting elements of the wiring. The cover plate 53 is then applied. The necessary connecting leads between those elements of the circuit which are located within the middle compartment 49, and annexe 50 and the other circuit elements located respectively in the end compartments 46 and 48 are arranged to pass through appropriate apertures in the walls 45 and 47.

If desired a small quantity of silica gel or other dehydrating material may be placed in one or both of the end compartments 46, 48, i.e. those which are not filled with potting material. If desired a communicating channel, which may also have wiring interconnections, therethrough, may be provided between the meter recess 63 and the end compartment 46 when this is provided with a dehydrating medium with a view of reducing or removing all risk of condensation on the inside of the meter viewing zone of the cover plate 53. If desired the normal protective glass of the meter 18 may be dispensed with.

It will be observed that the test terminals 10—14 and the other projecting controls constituted by the operating knob of the switch 17 and the control knob of the zero adjust resistance 23, are all mounted on the cover plate 51 which is set at a level appreciably below that of the other cover plate 53 of the instrument thereby facilitating the packaging or storage of the complete device within a rectangular box or case of minimum dimensions.

We claim:

1. An electrical measuring instrument for measuring both high and low resistance values which comprises a transistor oscillator device having a first low voltage input terminal, a second high voltage output terminal and a common low-voltage input terminal, a low voltage D.C. primary current source, first circuit means including a series resistance and a manual control switch connecting said low-voltage source across said first and common input terminals of said oscillator device, a rectifier, a common test terminal, a low resistance test terminal, a high resistance test terminal, a current indicating meter, second circuit means connecting said second terminal of said oscillator device to said high resistance test terminal through said rectifier, third circuit means connecting said low resistance test terminal to one side of said series resistance and further circuit means connecting said common test terminal to the opposite side of said series resistance through said current indicating meter.

2. An electrical measuring instrument for measuring both high and low resistance values which comprises an oscillator device including a transistor and having a first low voltage input terminal connected to the collector electrode of said transistor, a second high voltage output terminal and a common low voltage input terminal, a low voltage D.C. primary current source, first circuit means including a series resistance and a manual control switch connecting said low voltage source across said first and common input terminals of said oscillator device, a rectifier, a common test terminal, a low resistance test terminal, a high resistance test terminal, a current indicating meter, second circuit means connecting said second terminal of said oscillator device to said high resistance test terminal through said rectifier, third circuit means connecting said low resistance test terminal to said first terminal of said oscillator device and to one side of said series resistance and further circuit means connecting said common test terminal to the opposite side of said series resistance through said current indicating meter.

3. An electrical measuring instrument according to claim 1 which comprises a resistive potential divider network connected across said primary current source through said manual control switch and a further intermediate resistance test terminal connected to a tapping point of said potential divider network.

4. An electrical measuring instrument according to claim 3 in which said first circuit means includes a further serially connected variable resistance for use as a common zero adjusting means for said indicating meter on all resistance measurement ranges.

5. An electrical measuring instrument according to claim 4 in which said manual control switch is of the normally-open manually operable press-button type.

6. An electrical measuring instrument according to claim 1 which further comprises a protective casing of rigid material including at least a first compartment and a second compartment and in which said manual control switch is disposed within said first compartment and in which said series resistance is disposed within said second compartment embedded in a body of solid insulating material which is shaped to define a recess for receiving said current indicating meter, said current indicating meter being readily removable from said recess.

7. An electrical measuring instrument according to claim 6 in which at least said first compartment is closed by a panel of transparent material hermetically sealed to said casing and arranged to permit viewing of the scale and pointer of said indicating instrument therethrough.

8. An electrical measuring instrument according to claim 7 in which said closure panel also covers at least one further compartment therein, said further compartment containing a manually operable press-button switch having an operating head disposed in alignment with and beneath an orifice in said panely to permit operation therethrough, said orifice being covered and sealed by a flexible sheet of sealing material.

9. An electrical measuring instrument according to claim 8 in which said sheet of sealing material is formed by part of a sealing gasket interposed between said closure panel and said casing.

10. An electrical measuring instrument according to claim 9 in which one of the casing compartments is a lesser depth than the other compartments, said lesser depth compartment being closed by a panel carrying all of the outwardly projecting components such as terminals and control knobs whereby the overall height dimension of the instrument is that determined by said compartment closed by said transparent closure panel.

References Cited in the file of this patent

UNITED STATES PATENTS

| | | |
|---|---|---|
| 2,359,779 | Macadie et al. | Oct. 10, 1944 |
| 2,509,415 | Bernreuter | May 30, 1950 |
| 2,517,171 | Bernreuter | Aug. 1, 1950 |

FOREIGN PATENTS

| | | |
|---|---|---|
| 1,006,956 | Germany | Apr. 25, 1957 |